United States Patent [19]

Donguy

[11] Patent Number: 5,419,120
[45] Date of Patent: May 30, 1995

[54] DEVICE FOR PURGING COMBUSTION RESIDUES

[75] Inventor: Paul Donguy, Chatou, France

[73] Assignee: Societe Europeenne de Propulsion, Suresnes, France

[21] Appl. No.: 251,980

[22] Filed: Jun. 1, 1994

[30] Foreign Application Priority Data

Jun. 7, 1993 [FR] France .................................. 93 06788

[51] Int. Cl.⁶ ............................................. F02K 9/38
[52] U.S. Cl. ......................................... 60/253; 60/271
[58] Field of Search .............. 60/253, 271, 232, 200.1, 60/231; 102/381, 374

[56] References Cited

U.S. PATENT DOCUMENTS 3,134,224  5/1964  Lippincott et al. .
3,648,461  3/1972  Bailey et al. ............................ 60/271

FOREIGN PATENT DOCUMENTS 1368946  6/1964  France .
2453984  12/1980  France .................................. 60/253
8253  1/1983  Japan .................................... 60/271
162758  7/1987  Japan .................................... 60/253
2076061  11/1981  United Kingdom ................... 60/271

OTHER PUBLICATIONS

Boraas, S. "Modeling Slag Deposition in the Space Shuttle Solid Rocket Motor", *Journal of Spacecraft and Rockets*, Feb., 1984. pp. 47–54.

*Primary Examiner*—Timothy S. Thorpe
*Attorney, Agent, or Firm*—Weingarten, Schurgin, Gagnebin & Hayes

[57] ABSTRACT

The present invention relates to a device for purging combustion residues from a thruster that comprises firstly a combustion chamber designed to receive a solid propellant and secondly a nozzle for evacuating propulsion gases and connected to the bottom of said chamber while leaving an annular space in which liquid residues of propellent combustion can accumulate. The device comprises at least one tube fixed on the converging part of the nozzle by fixing means, said tube including a first end dipped in the mass of liquid formed by said combustion residues and at a determined distance j from the bottom of the chamber, and a second end emerging level with the top end of the converging part and set back a little from the throat of the nozzle.

6 Claims, 2 Drawing Sheets

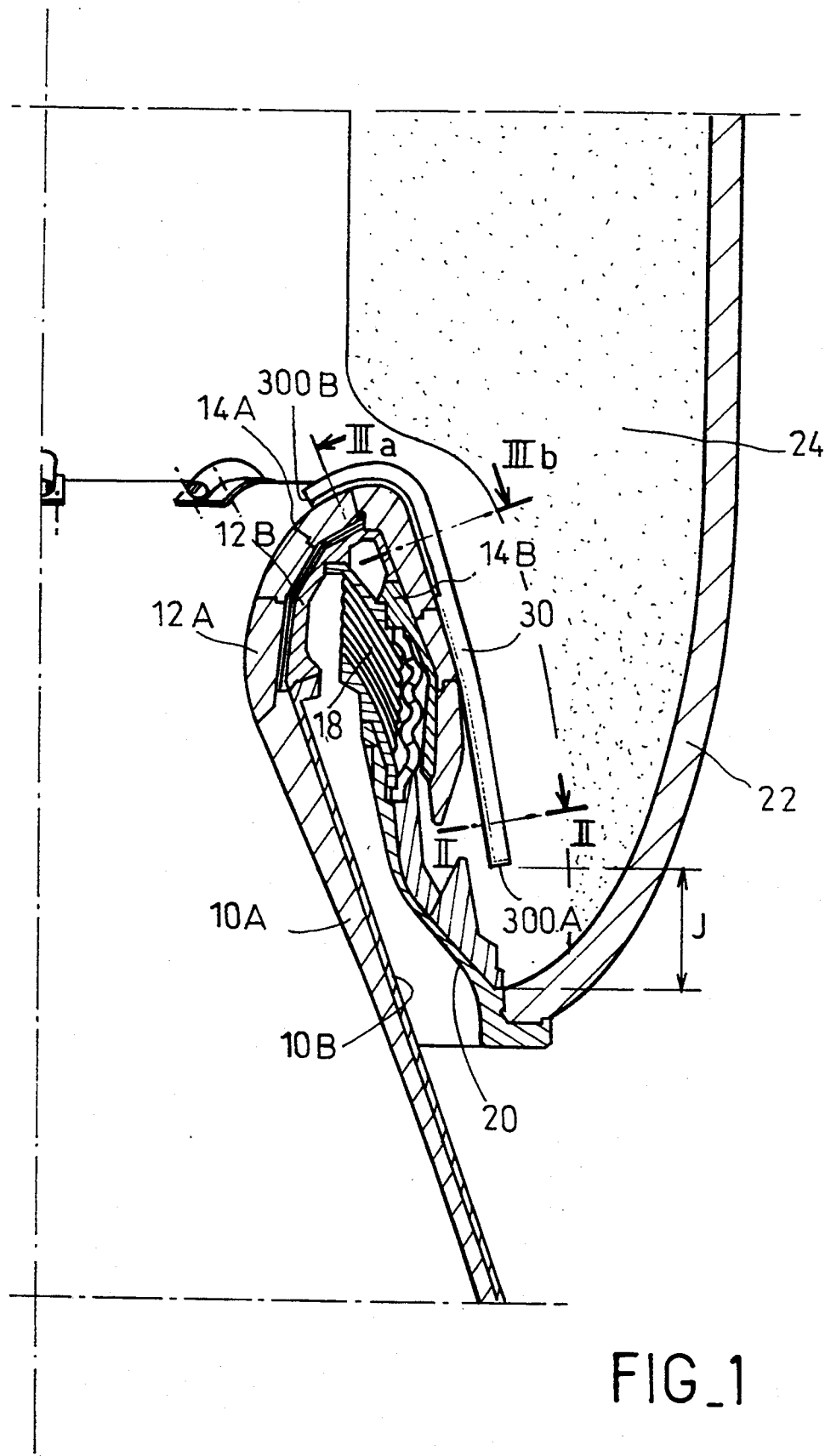
FIG_1

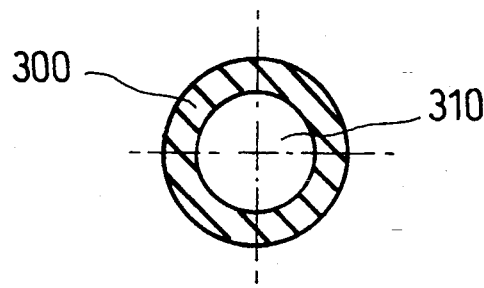
FIG_2
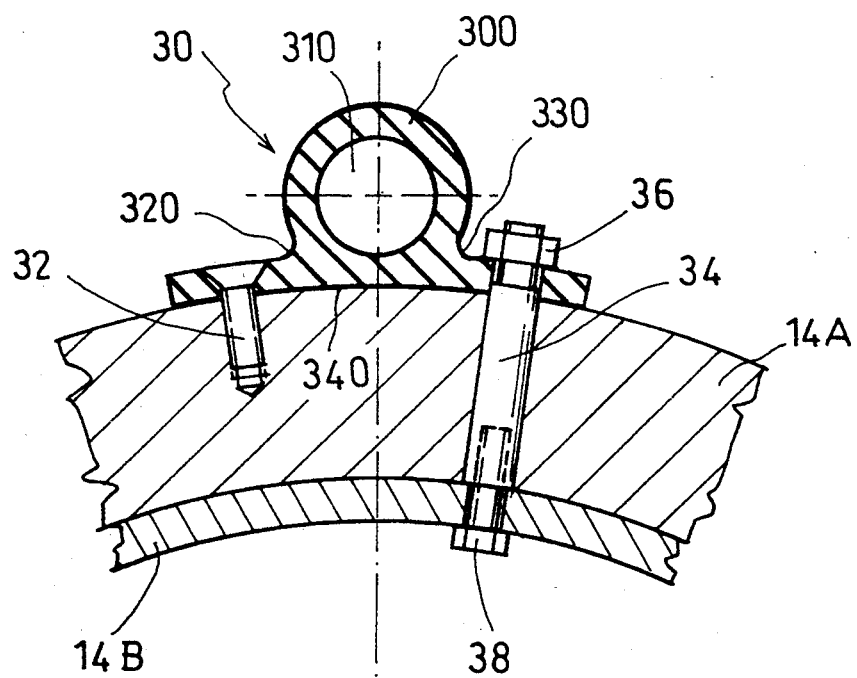
FIG_3

DEVICE FOR PURGING COMBUSTION RESIDUES

The present invention relates to a device for purging combustion residues and is intended mainly for implementation in a solid propellent engine.

BACKGROUND OF THE INVENTION

Conventionally, when it is desirable to have a solid propellent rocket engine with a steerable ejection nozzle, the nozzle is mounted on a flexible hinge whose fixed portion is secured to the wall of the combustion chamber of the engine. To facilitate such mounting and to enable the nozzle to be integrated in the chamber, the rear end of the nozzle generally has a special shape like the "kick" or "punt" at the bottom of a bottle, and unfortunately, by defining an annular trough between the wall of the nozzle and the wall of the chamber, that shape creates a trap in which solid or liquid bodies can collect during the flight of the thruster.

When solid propellent burns, it causes combustion residues to be formed. For solid propellents that contain aluminum, one of the residues is alumina. During combustion of the propellent (which takes place at temperatures higher than the melting point of alumina), said alumina is in the liquid state, in the form of fine droplets. These droplets are of a size that depends essentially on the grain size of the propellent (in the range 20 $\mu$m to 120 $\mu$m, for example), and they are normally entrained by the flow of propulsion gases simultaneously with the other combustion products, and they solidify during expansion prior to being evacuated in solid form through the nozzle.

However, the greater the size of such droplets, the more difficult it becomes to entrain them towards the nozzle by means of the flow of propellent gases. This applies in particular for droplets having a size of about 100 $\mu$m which, instead of being evacuated through the nozzle, collect in the above-mentioned trap where they end up by forming a puddle of liquid alumina. Given the masses involved, this puddle then behaves like ballast which decreases the payload that can be put into orbit in a manner that is particularly significant, given that 250 tons of propellent can produce a residual mass of 2 tons of alumina.

OBJECTS AND SUMMARY OF THE INVENTION

Thus, an object of the invention is to provide a solid propellent engine which, for a given mass of propellent, makes it possible to carry a larger payload without requiring fundamental modification to the structure of the engine.

The present invention provides a device for purging combustion residues, making it possible during combustion of the propellent to evacuate liquid residues that accumulate in the bottom of the thruster.

More particularly, the device for purging combustion residues from a thruster that comprises firstly a combustion chamber designed to receive a solid propellent and secondly a nozzle for evacuating propulsion gases and connected to the bottom of said chamber while leaving an annular space in which liquid residues of propellent combustion can accumulate, comprises at least one tube fixed on the converging part of the nozzle by fixing means, the tube including a first end dipped in the mass of liquid formed by said combustion residues and at a determined distance j from the bottom of the chamber, and a second end emerging level with the top end of the converging part and set back a little from the throat of the nozzle.

By means of this special structure, because of the pressure difference that exists between the pressure inside the combustion chamber and the lower pressure in the converging part of the nozzle, the liquid residues present in the bottom of the thruster is sucked into the purge tubes and is thus expelled together with the propulsive flow.

Over a determined fraction of its length, each purge tube includes fastening zones enabling it to be secured to the converging part by the fixing means.

It is important for these tubes not to be ejected themselves with the propulsive flow, so they require fixing means in sufficient quantity. Thus, the fixing means comprise a plurality of first fastener elements between a first fastening zone and the inside portion of the converging part and a plurality of second fastener elements between a second fastening zone and the outside portion of the converging part.

Preferably, each of the second fastener elements includes a tie rod connected firstly to the outside portion of the converging part by means of a first holding member and secondly to a tube fastening zone by means of a second holding member.

Given the temperatures involved, each purge tube is made of a composite material having carbon reinforcement and a carbon matrix. The same applies to the first fastener elements and to the second holding members.

BRIEF DESCRIPTION OF THE DRAWINGS

Other characteristics and advantages of the present invention appear better from the following description given by way of non-limiting indication and made with reference to the accompanying drawings, in which:

FIG. 1 shows a purge device of the invention located at the bottom of a thruster;

FIG. 2 is a section through the device on section line II—II of FIG. 1; and

FIG. 3 is a view in which the lefthand portion is a section on line IIIa of FIG. 1 and in which the righthand portion is a section on IIIb. This view shows the fastener means for fastening the purge device of the invention to the body of the thruster.

MORE DETAILED DESCRIPTION

FIG. 1 is a fragmentary section through a solid propellent rocket engine provided with a purge device of the invention. The nozzle of a thruster is constituted in conventional manner by a diverging part 10 that is extends a throat 12 at which a converging part 14 terminates. Given the forces and the temperatures involved, each of these elements is constituted in conventional manner by two portions, an inside portion in contact with the propellent gases and ensuring that the structure can withstand the temperature involved (referenced by the letter A) and an outside portion providing mechanical strength (reference by the letter B). The converging part 14 constituting the rear end of the nozzle has a top end connected to the throat 12 and a turned-over bottom end whose outside portion 14B is connected via a flexible hinge 18 to a wall 20 that extends said turned-over end of the converging portion and that co-operates with the side wall of the combustion chamber 22 to which it is securely fixed to form the bottom of said chamber. This bottom thus has a shape similar to the kick or punt at the bottom of a bottle and it leaves an annular space 24 between the end of the converging part and the wall of the chamber. This space is initially filled in part with solid propellent only, but while combustion is taking place it fills up with residues so as to form a liquid puddle, in particular of alumina when using a propellent that includes aluminum.

The Applicant has observed that when using a solid propellent containing nearly 20% aluminum, the volume of the resulting alumina puddle (which depends largely on the grain size of the propellent, but the axial acceleration of the thruster is also a contributing factor), can achieve proportions that are not negligible since with an initial mass of propellent equal to 230 metric tons and giving rise to low acceleration of only 1 g, this space can contain a mass of nearly 2 metric tons of alumina, thereby corresponding to a loss of payload in orbit of about 300 kg.

The present invention seeks to evacuate these residues that accumulate in the bottom of the thruster by means of a purge device comprising a series of tubes 30 fixed on the inside wall 14A of the converging part of the nozzle of the thruster, one end 300A of each tube being dipped in the puddle of liquid residue while leaving clearance j of determined size that is sufficient to allow the nozzle to tilt about its hinge 18 without causing the end of the tube to come into abutment against the bottom of the chamber, while the opposite end 300B of each tube opens out into the top end of the converging part, at a point that is set back slightly from the throat of the nozzle 12, i.e. on a circle of diameter that is greater than the diameter of the throat.

FIGS. 2 and 3 show more precisely the structure of a tube 30 and of the way in which it is assembled to the converging part 14. With the exception of a fastening zone for fastening the tube to the converging part, the purge tube has a uniform body 300 having an inside duct 310. In the embodiment shown, this tube is advantageously circular in section, but naturally that shape is not limiting in any way. Inside the fastening zone which preferably extends from the top end of the tube 300B over a distance which is determined to be sufficient to avoid the tube being ejected during combustion, the body of the tube is extended by diametrically opposite tabs 320 and 330 that form a cross-piece and that has a bearing surface 340 designed to come into contact with the converging part. The purge tube is securely fastened to the converging part by fixing means 32, 34, 36, and 38 disposed between the tabs and the inside and outside portions of the converging part. Thus, first fastener elements 32 may be mounted between a first tube fastening zone formed by the tab 320 and the inside portion of the converging part 14A. Similarly, second fastener elements 34, 36, 38 may be mounted between a second fastening zone formed by the tab 330 and the outside portion of the converging part 14B. This connection with the outside portion of the converging part requires a passage through its inside portion, so the second fastener elements include respective tie rods 34 passing through said inside portion of the converging part and fixed firstly to a fastening zone 330 of the tube and secondly to the outside portion of the converging part 14B.

The operation of the purge device of the invention is described below. To this end, it is important to observe that the liquid residues present in the bottom of the thruster are subjected to the static pressure that obtains inside the combustion chamber, whereas the static pressure that exists in the throat of the nozzle is less than that which obtains inside the chamber. The dimensions and number of the tubes 30 depend on the rate at which residues are to be purged, and each tube 30 has one of its two ends dipped in the mass of liquid while its other end is placed in the converging part at a point that is set back slightly from the throat of the nozzle. Given the pressure difference between the two ends of the tube, sufficient suction is then established along the tube to suck up the liquid residue from the bottom of the chamber towards the converging part, and thus towards the outside. Prior to said residues forming, this suction has the sole effect of transferring the hot gases that are present in the bottom of the chamber towards the nozzle, which has no harmful effect on operation. The person skilled in the art has no difficulty in determining the preferred location (in the converging part) for the top end of the tube having a section ratio suitable for ensuring sufficient suction to compensate for the effects of acceleration on the column of liquid residue rising inside the tube, and to avoid jerky suction interspersed with bubbles. Similarly, it is easy for the person skilled in the art to determine the distance j that suffices to enable the nozzle to tilt about its hinge without the bottom end of the tube coming into contact with the bottom of the chamber.

The following working is an approximate calculation for the dimensions of the tube suitable for use in a thruster having solid fuel containing 18% aluminum. It may be assumed that during a flight of 60 seconds, a mass of 5100 kg of alumina will attempt to accumulate in the bottom of the combustion chamber of the thruster. The flow rate to be purged is thus 5100/60=85 kg/s, or alternatively 21 liters per second (l/s). Assuming that the flow speed is 5 cm/s (which speed depends on the viscosity of alumina), the necessary purge cross-section is 21000/5 =4200 cm$^2$, and given a nozzle throat of diameter 90 cm, that means it is possible to consider installing 10 tubes each having an inside diameter of about 23 cm. Naturally, the above brief calculation is given purely by way of explanation and gives no more than an approximate idea of the dimensions that may be required for said tubes.

In order to withstand the temperatures involved during combustion of solid propellent, the purge tubes are made of a conventional type composite material having carbon reinforcement and a carbon matrix such as the Novoltex® type Sepcarb® made by the Applicant. The first fastener elements between the tube of composite material and the inside portion of the converging part itself made of composite material are themselves made of composite material and are constituted, for example, by carbon-carbon screws. The second fastener elements between the composite tube and the outside portion of the converging part that is constituted by a metal structure include a carbon-carbon composite tie rod fixed to the tube by means of a carbon-carbon nut and fixed to the outside portion of the converging part by a metal screw. Naturally, the tie rod is adjusted on the inside portion of the converging part in such a manner as to provide sealing against the flow of gases so as to avoid overloading the outside metal portion of the converging part.

It may be observed that in the context of the above application, since alumina reacts with carbon, it is necessary to provide purge tubes of sufficient excess thickness to compensate for decomposition where contact takes place between the alumina and the tube-forming carbon-carbon composite material, which decompensation has been observed to take place at about 1 mm to 2 mm per minute.

Naturally, numerous modifications in particular with respect to the fixing means and numerous additions can be provided by the person skilled in the art to the device as described above without going beyond the ambit of the invention.

I claim:

1. A device for purging combustion residues from a thruster that comprises firstly a combustion chamber adapted to contain a solid propellant and secondly a nozzle adapted to direct propulsion gases through a throat of said nozzle, said nozzle connected at a bottom of said chamber to a combustion wall of said chamber, said nozzle further having a converging part separated from the combustion wall of the chamber by an annular space in which liquid residues of propellant combustion accumulate, the device comprising:

at least one tube fixed on an outside portion of the converging part of the nozzle by fixing means, said at least one tube including a first end positioned where liquid residues of propellant combustion can accumulate, said first end being at a distance j from the bottom of the chamber, and a second end positioned generally level with a top end of the converging part while being set back partially from the throat of the nozzle.

2. A purge device according to claim 1, wherein the tube includes over a determined fraction of its length, fastening zones enabling it to be secured to the converging part by the fixing means.

3. A purge device according to claim 1, wherein the fixing means includes a plurality of first fastener elements disposed between a first fastening zone and an inside portion of the converging part and a plurality of second fastener elements disposed between a second fastening zone an the outside portion of the converging part.

4. A purge device according to claim 3, wherein each of the plurality of second fastener elements includes a tie rod connected firstly to the outside portion of the converging part by means of a first holding member and secondly to the second tube fastening zone by means of a second holding member.

5. A purge device according to claim 3, wherein the plurality of first fastener elements and the second holding members are made of a composite material having carbon reinforcement and a carbon matrix.

6. A purge device according to claim 1, wherein the tube is made of a composite material having carbon reinforcement and a carbon matrix.

* * * * *